United States Patent [19]

Macaulay et al.

[11] 3,708,349
[45] Jan. 2, 1973

[54] METHOD OF CONSTRUCTING MULTICELL BATTERIES

[75] Inventors: William R. Macaulay, Madison; John M. Bilhorn, Edgerton; Kent V. Anderson, Madison, all of Wis.

[73] Assignee: ESB Incorporated

[22] Filed: June 25, 1971

[21] Appl. No.: 156,686

[52] U.S. Cl. ................................... 136/175, 136/111
[51] Int. Cl. .............................................. H01m 23/04
[58] Field of Search .............................. 136/111, 175

[56] References Cited

UNITED STATES PATENTS

| 3,004,094 | 10/1961 | Haessly | 136/175 |
| 3,116,173 | 12/1963 | Raper | 136/175 |
| 3,607,430 | 9/1971 | Glover | 136/175 |

*Primary Examiner*—Donald L. Walton
*Attorney*—Robert H. Robinson et al.

[57] ABSTRACT

A method of constructing multicell batteries includes placing intermittent deposits of electrodes along Zones No. 1, No. 2 and No. 3. Zone No. 1 is defined as a composite of a first continuous strip of electrically conductive plastic and a second continuous strip of electrically conductive material; intermittent deposits of positive electrodes are placed on the plastic side of Zone No. 1. Zone No. 2 is defined as a composite of a first continuous strip of electrically conductive plastic and a second continuous strip of electrically conductive material; intermittent deposits of negative electrodes are placed on the plastic side of Zone No. 2. Zone No. 3 is defined as a continuous strip of electrically conductive plastic; intermittent deposits of positive and negative electrodes are placed along Zone No. 3, each deposit of positive electrode being on the other side of a Zone No. 3 from and substantially opposite a deposit of negative electrodes. The continuous Zones with the electrodes deposited thereon are collated so that at least one Zone No. 3 is between a Zone No. 1 and a Zone No. 2, so that the electrically conductive plastics in Zone No. 1 and No. 2 are facing the inside of the collation, and so that a deposit of positive electrode on one Zone is opposite a deposit of negative electrode on an adjacent Zone. A separator and electrolyte is placed between each adjacent pair of electrodes in the collation, after which the Zones are sealed together around and between the electrode deposits.

Zones No. 1, No. 2 and No. 3 may be structurally connected portions of a continuous web while the electrodes are being applied, in which case the web is cut to structurally disconnect the Zones after electrode application. Alternatively, Zones No. 1, No. 2 and No. 3 may be structurally unconnected during electrode application.

The second continuous strips of electrically conductive material which are members of the composites in Zones No. 1 and No. 2 may be: foils of metals such as steel, aluminum, lead or zinc; metalized deposits such as flame strays, vapor deposits, sputtering, and others; or films impregnated with metallic or other conductive particles. One of these second continuous strips may be wider than and extend beyond the edge of the conductive plastic strip to which it is joined: the extension is wrapped around the edge of the collation and overlaid above the other composite Zone on the other side of the collation to produce a battery having both terminals on one face.

25 Claims, 17 Drawing Figures

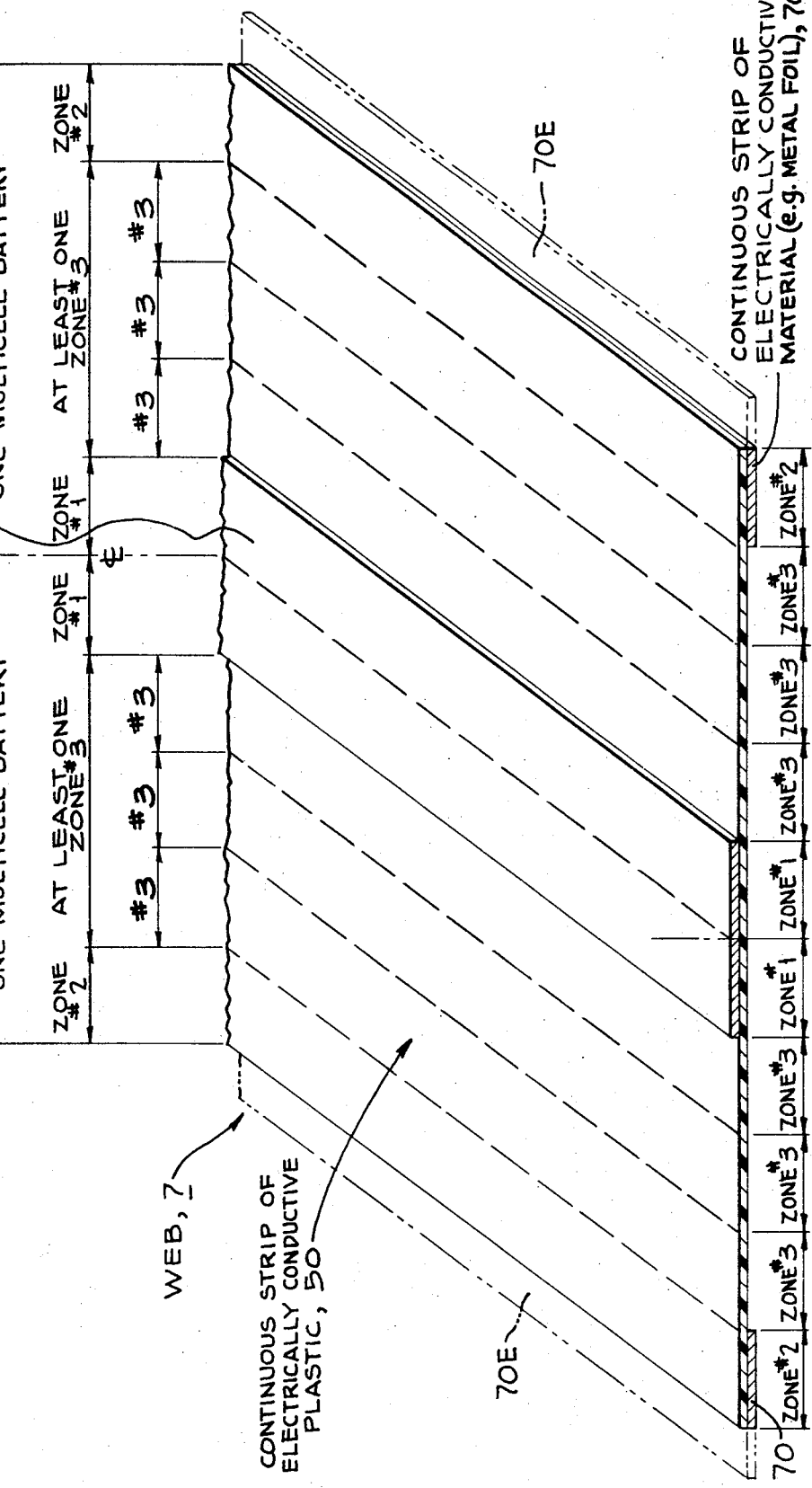

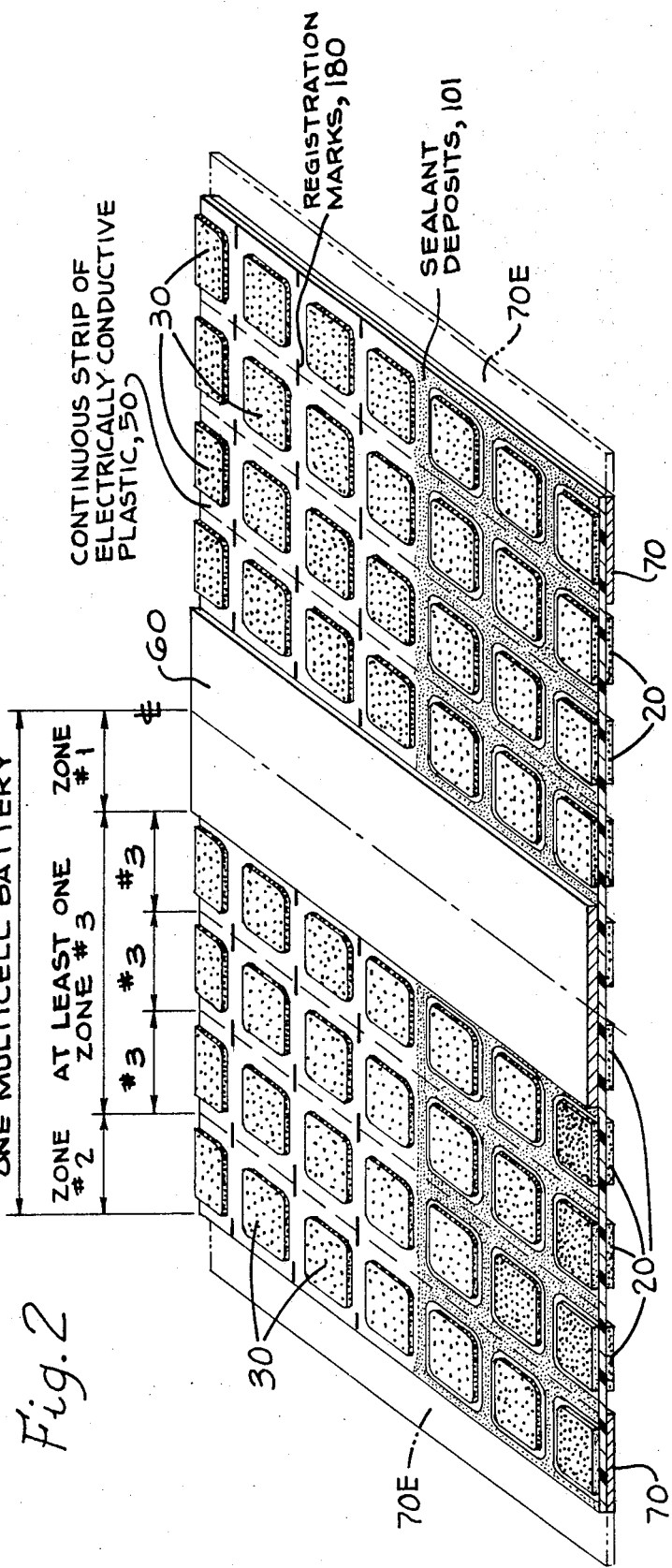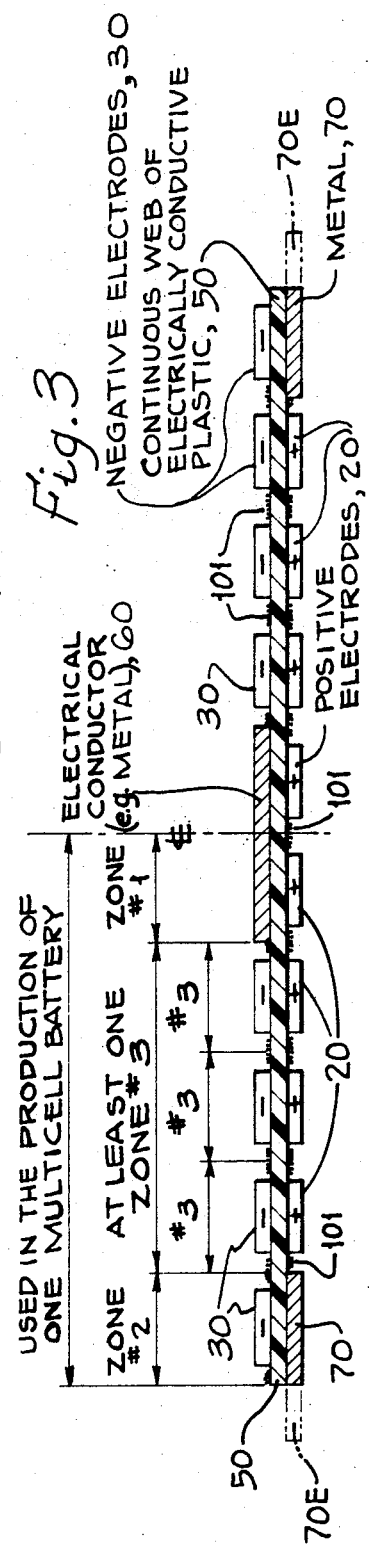

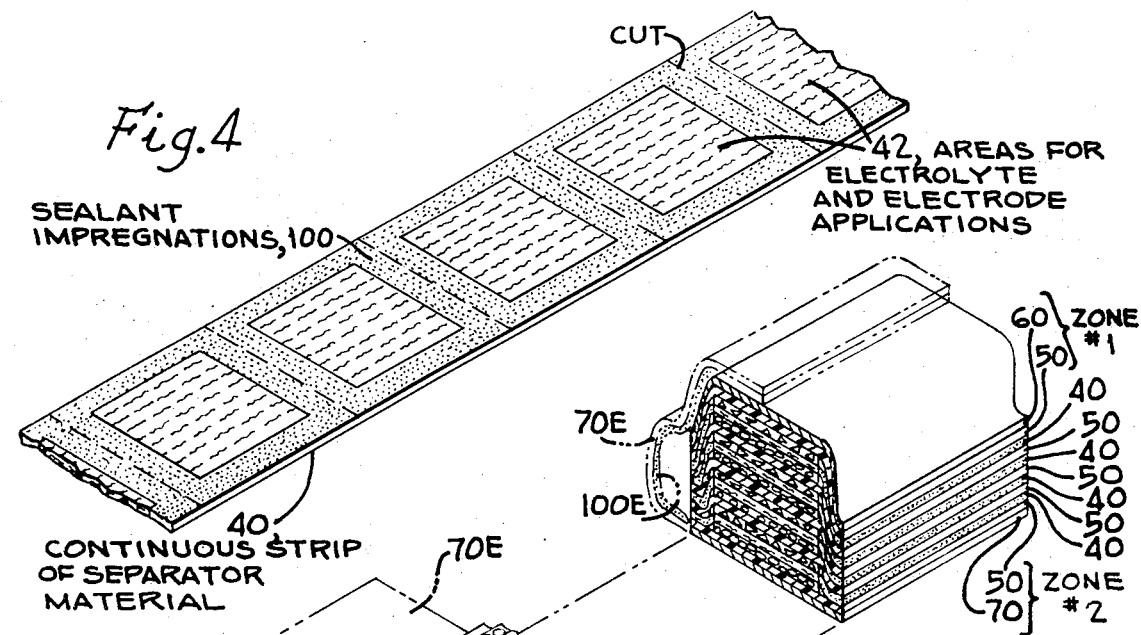
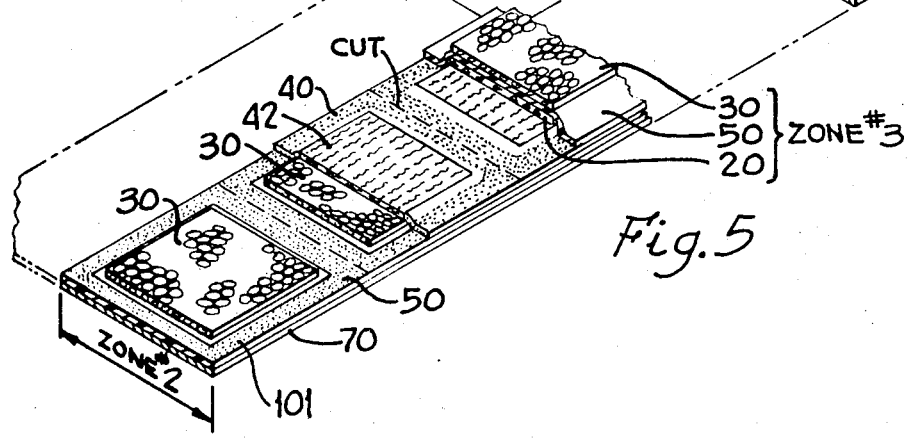
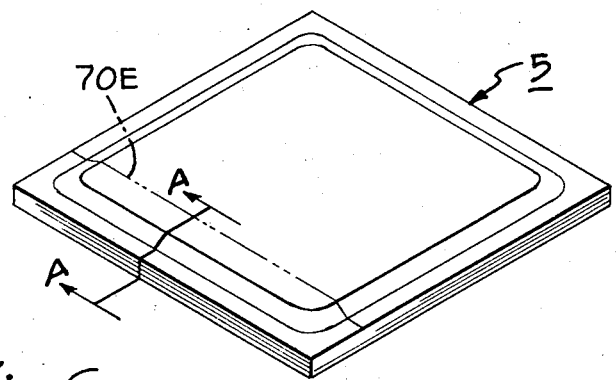

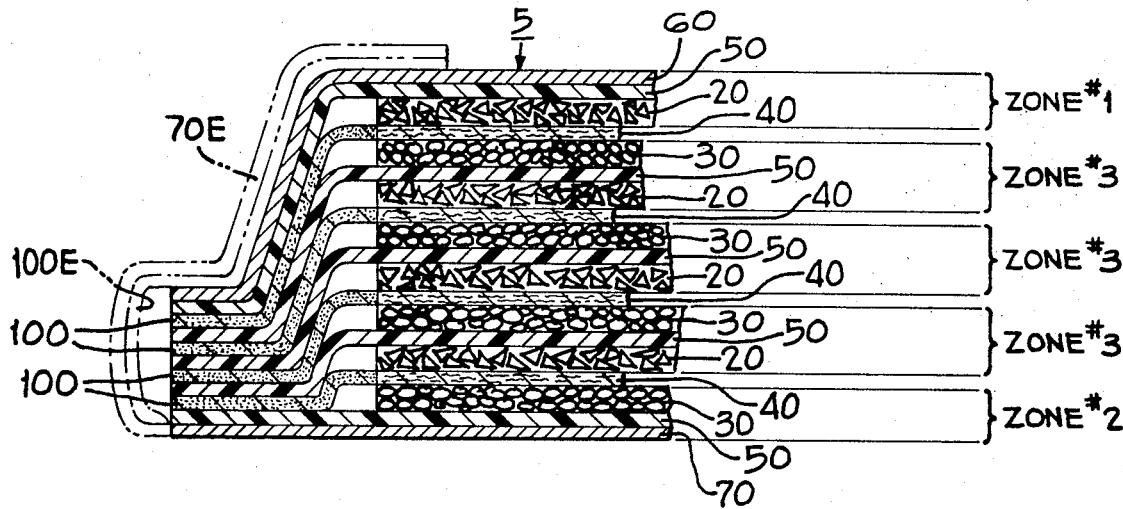
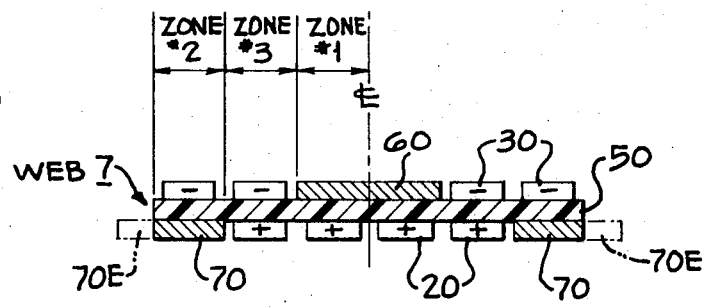
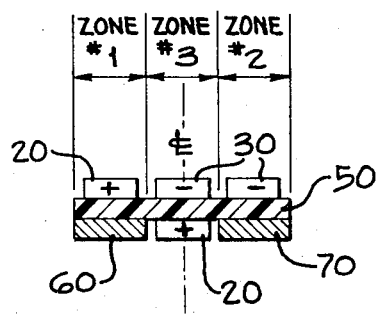

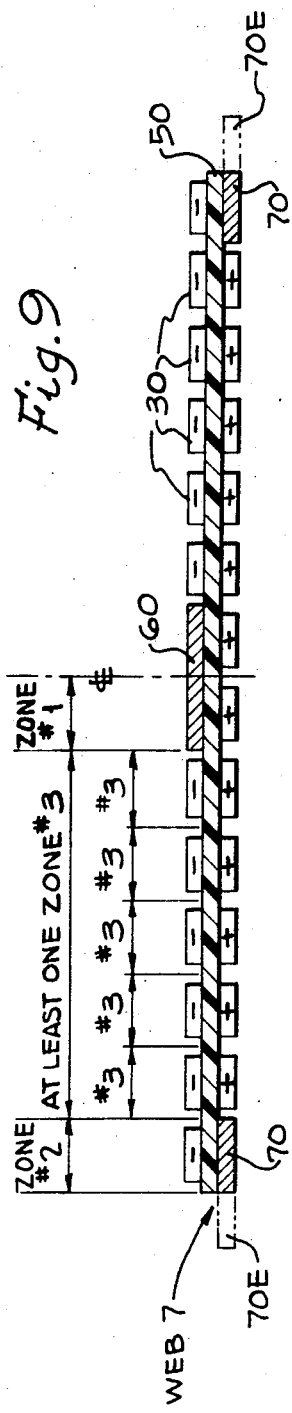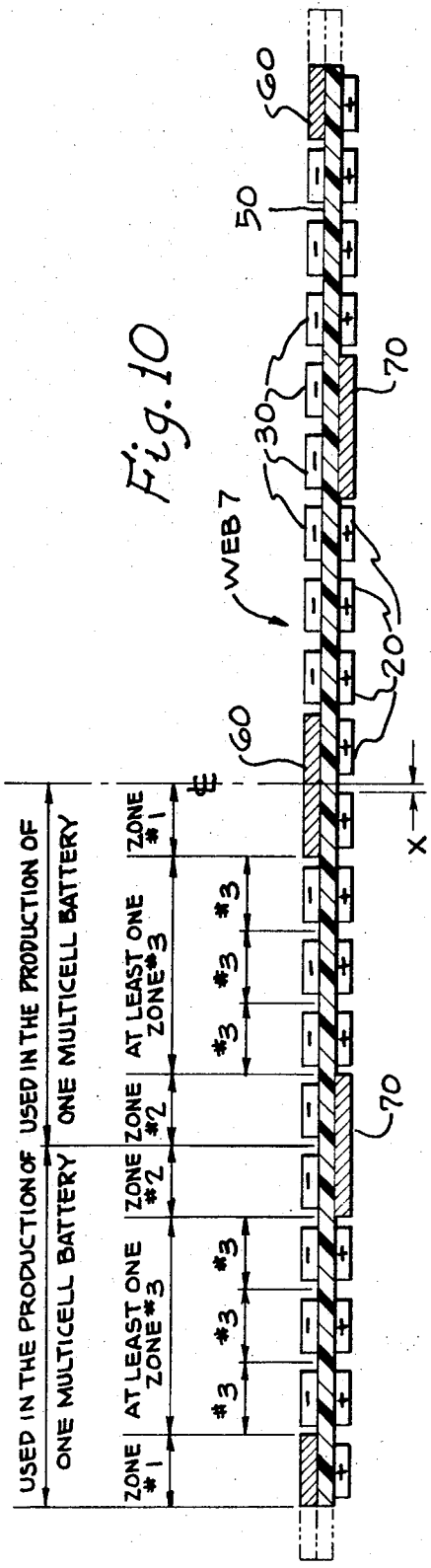

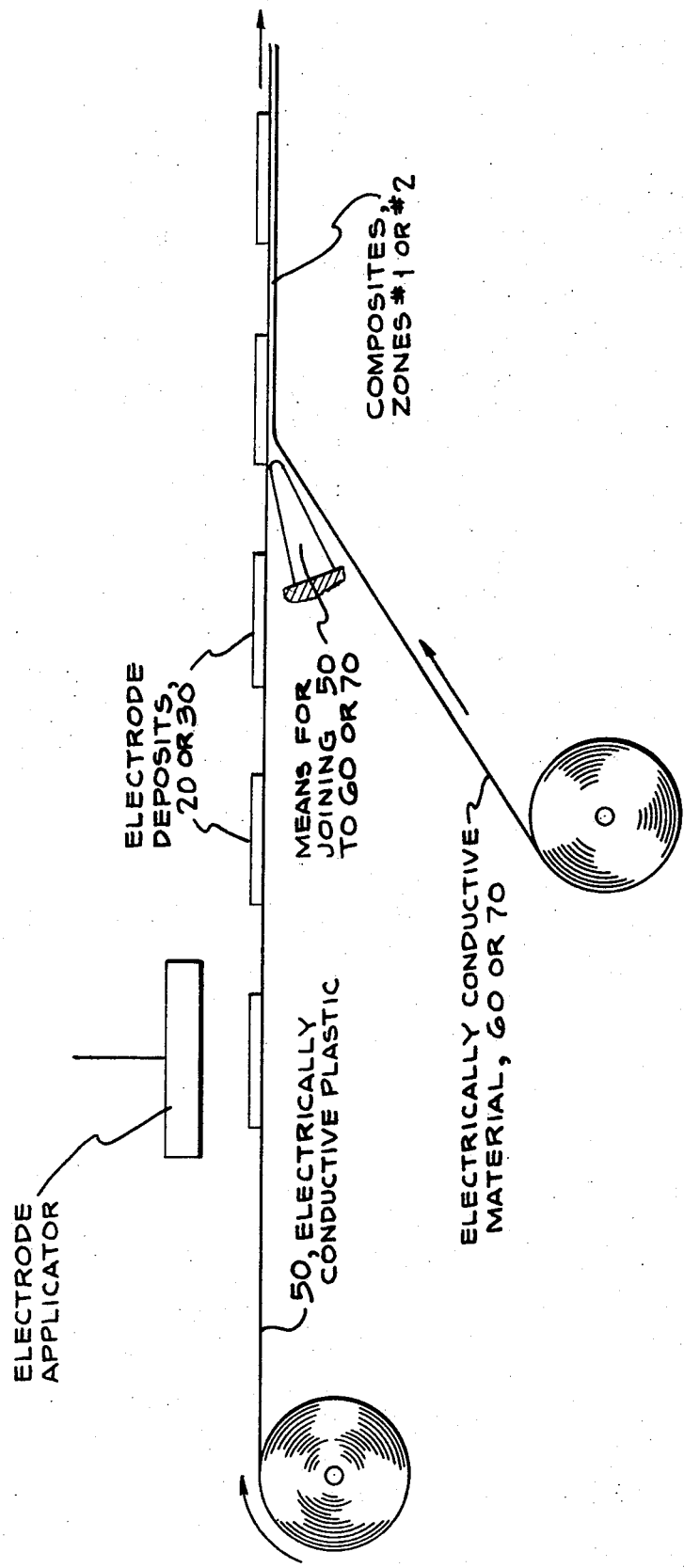

METHOD OF CONSTRUCTING MULTICELL BATTERIES

BACKGROUND OF THE INVENTION

In a previously filed application, Ser. No. 100,257, it has been proposed to construct duplex electrodes by placing intermittent deposits of positive and negative electrodes on opposite sides of a continuous, electrically conductive plastic carrier strip. Use of the continuous carrier strip as a substrate along which intermittent deposits of electrodes are applied is advantageous from the viewpoint of modern manufacturing techniques since modern, high speed production machinery is better able to handle continuous strips than a succession of discrete pieces. Maximum advantage of this principle may be attained by assembling the multicell batteries while the duplex electrodes are structurally connected by the continuous plastic carrier strip; afterward the carrier strip is cut between duplex electrodes to obtain structurally unconnected multicell batteries.

In another previously filed application, Ser. No. 99,985, it has been proposed to build a battery having a wrapper which consists of two pieces sealed around their perimeters. Each wrapper piece comprises a laminate of metal and electrically conductive plastic, the conductive plastic in each of the laminates being in contact with an end electrode within the battery. The wrapper pieces are closed around their perimeters to produce a liquid impervious sealed battery. The wrapper pieces provide superior resistance to the penetration of moisture and therefore increase the shelf life of the battery. Another of their advantages is the fact that they can be placed directly in contact with the end electrodes without producing any undesired electrochemical reactions. Still another and an important advantage of the laminated wrapper pieces is associated with the relative conductivities of the conductive plastics and the metals. Conductive plastics tend to be good conductors of electricity in their transverse direction, i.e., across their thicknesses, but they are poorer conductors of electrical current in their longitudinal direction. The metal, on the other hand, is a good conductor in all directions and is therefore well suited to collect current all along its interface with the adjacent conductive plastic and to conduct that current longitudinally to a terminal.

In attempting to implement and integrate these proposals a number of problems have been encountered. These problems, which are interrelated to each other, concern such matters as how to maintain proper tension in continuous members during their processing; how to register and collate various members of the battery properly; how to bring the end electrodes in contact with the laminated wrapper pieces; how to get a good seal around the perimeter of each battery; how to design a process for constructing batteries which reduces per unit operating costs; and how, when it is desired to do so, to construct the battery so that its terminals will be on the same side of the battery.

SUMMARY OF THE INVENTION

This invention, which is an improvement over the one described in Ser. No. 100,257, is directed to a simultaneous and satisfactory solution to all of the aforementioned problems.

This invention concerns a method of constructing multicell batteries which includes placing intermittent deposits of electrodes along Zones Number 1, Number 2 and Number 3. Zone Number 1 is defined as a composite of a first continuous strip of electrically conductive plastic and a second continuous strip of electrically conductive material; intermittent deposits of positive electrodes are placed on the plastic side of Zone Number 1. Zone Number 2 is defined as a composite of a first continuous strip of electrically conductive plastic and a second continuous strip of electrically conductive material; intermittent deposits of negative electrodes are placed on the plastic side of Zone Number 2. Zone Number 3 is defined as a continuous strip of electrically conductive plastic; intermittent deposits of positive and negative electrodes are placed along Zone Number 3, each deposit of positive electrode being on the other side of a Zone Number 3 from and substantially opposite a deposit of negative electrodes. The continuous Zones with the electrodes deposited thereon are collated so that at least one Zone Number 3 is between a Zone Number 1 and a Zone Number 2, so that the electrically conductive plastics in Zones Number 1 and Number 2 are facing the inside of the collation, and so that a deposit of positive electrode on one Zone is opposite a deposit of negative electrode on an adjacent Zone. A separator and electrolyte is placed between each adjacent pair of electrodes in the collation, after which the Zones are sealed together around and between the electrode deposits.

Zones Number 1, Number 2 and Number 3 may be structurally connected portions of a continuous web while the electrodes are being applied, in which case the web is cut to structurally disconnect the Zones after electrode application. The web is preferably symmetrical about its center line. Alternatively, Zones Number 1, Number 2 and Number 3 may be structurally unconnected during electrode application. With still another alternative, the joining of the second continuous strips of electrically conductive plastic to form the composite Zones Number 1 and Number 2 may be done after the intermittent deposits of electrodes have been applied onto those strips of conductive plastic.

The second continuous strips of electrically conductive material which are members of the composites in Zones Number 1 and Number 2 may be: foils of metals such as steel, aluminum, lead or zinc; metalized deposits such as flame sprays, vapor deposits, sputtering, and others; or films impregnated with metallic or other conductive particles. One of these second continuous strips may be wider than and extend beyond the edge of the conductive plastic strip to which it is joined; the extension is wrapped around the edge of the collation and overlaid above the other composite Zone on the other side of the collation to produce a battery having both terminals on one face.

Preferably the positive and negative electrodes, when placed onto the conductive plastic of Zones Number 1, Number 2 and Number 3, comprise active material particles dispersed in a binder matrix. While a wide variety of electrochemical systems may be employed, a particular embodiment of the invention uses the LeClanche system in which the positive electrode active materials are manganese dioxide, the negative electrode active material particles are zinc, and the electrolyte comprises a chloride solution made from chloride salts selected from the group consisting of ammonium chloride and zinc chloride.

As mentioned above, the Zones Number 1, Number 2 and Number 3 may be structurally connected together and may therefore comprise a wide web while the electrodes are being applied and during several of the subsequent steps. Use of the wide web throughout much of the processing tends to minimize registration and collation problems. It is particularly desirable to have the single wide web by symmetrical about its center line. Instead of the single wide web, however, the required number of Zones Number 1, Number 2 and Number 3 may be structurally unconnected from each other during electrode application. Use of several continuous strips rather than a single wide web permits each strip to have a uniform cross section, permits differing amounts of tension to be exerted among the strips, simplifies the production of the composites in Zones Number 1 and Number 2, and may result in additional advantages.

BRIEF DESCRIPTION OF THE DRAWINGS

As a prelude to a description of the drawings it should be remarked that the thicknesses of the members shown in the drawings have been greatly exaggerated for purposes of illustration. Thicknesses which are typical of those which might actually be used will be given together with other representative dimensions later in this account of the invention.

FIG. 1 illustrates an embodiment in which Zones Number 1, Number 2 and Number 3 are structurally connected portions of a continuous wide web before the electrodes are applied. The web, which is symmetrical about its center line, contains enough Zones Number 1, Number 2 and Number 3 to permit the production of two four-cell batteries.

FIG. 2 illustrates the web of FIG. 1 after the deposits of electrodes have been applied.

FIG. 3 illustrates an end or cross-sectional view of the web shown in FIG. 2.

FIG. 4 illustrates a continuous strip of separator material. Patches of adhesive are impregnated into the strip, each patch being in the form of a closed loop. Electrolyte is impregnated into the area of the separator strip inside each loop.

FIG. 5 illustrates a continuous strip of partially and fully assembled multicell batteries.

FIG. 6 is an oblique view of a multicell battery made according to this invention after the battery has been structurally disconnected from other similar batteries.

FIG. 7 is a partial cross-section of the multicell battery shown in FIG. 6 taken along the line A—A of that Figure.

FIGS. 8, 9, 10, 11, 12, 13 and 14 represent web configurations which are alternatives to the ones shown in FIGS. 1, 2 and 3.

FIG. 17 illustrates that joining of the two continuous strips to produce composite Zones Number 1 or Number 2 may be accomplished after the electrodes have been applied onto one side of the electrically conductive plastic.

DESCRIPTION OF THE PREFERRED EMBODIMENTS

Figure 11:
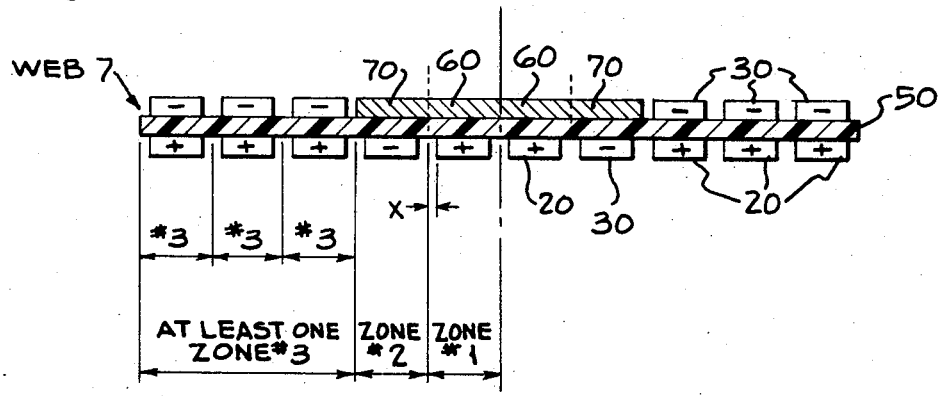

It should be remarked that the thicknesses of the members shown in the drawings have been greatly exaggerated for purposes of illustration. Thicknesses which are typical of those which might actually be used will be given together with other representative dimensions later in the description of this invention.

For simplicity the description of the invention will be divided into several sections, each dealing with one or more embodiments or aspects of the invention.

Section 1: The Single Wide Web

This section will describe several embodiments of the invention which have in common the characteristics that Zones Number 1, Number 2 and Number 3 are structurally connected together to comprise a continuous single wide web while the electrodes are being applied. Each embodiment also illustrates a web which is symmetrical about its center line. FIGS. 1–3 and 8–14 illustrate several embodiments of the single wide web.

FIG. 1 illustrates a web 7 which contains enough Zones Number 1, Number 2 and Number 3 to permit the production of two four-cell batteries. The web comprises one continuous strip of electrically conductive plastic 50 and three other continuous strips of electrically conductive material joined thereto, one of these three strips being a metal 60 which is situated in the center of the plastic 50 and the other two strips also being metals 70 which are joined to side of the plastic opposite metal 60 and which are situated near the edges of the plastic. While the edges of the conductive strips 60 and 70 could extend to the edges of their respective Zones, it is preferable to recess them slightly, e.g., one-sixteenth inch, from each edge of the Zone to facilitate cutting or slitting the web apart. While FIG. 1 uses dashed and center lines to demarcate the boundaries of Zones Number 1, Number 2 and Number 3, it should be understood that those lines are used in the drawings for purposes of illustration only and no such lines are required on an actual web. It will be seen that Zone Number 1 is defined as a composite of a first continuous strip of electrically conductive plastic 50 and a second continuous strip of electrically conductive material 60, Zone Number 2 is defined as a composite of a first continuous strip of electrically conductive plastic 50 and a second continuous strip of electrically conductive material 70, and that Zone Number 3 is defined as a continuous strip of electrically conductive plastic 50. In the web 7 shown in FIG. 1, the conductive plastic 50 components of Zones Number 1, Number 2 and Number 3 are all undivided portions of one wide sheet of conductive plastic.

The construction of multicell batteries begins by placing intermittent deposits of positive electrodes 20 along the plastic side of Zone Number 1, by placing intermittent deposits of negative electrodes 30 along the plastic side of Zone Number 2, and by placing intermittent deposits of positive and negative electrodes 20 and 30 respectively along each Zone Number 3 so that each deposit of positive electrode 20 is on the other side of the Zone Number 3 from and substantially opposite a deposit of negative electrode 30. Illustrations of the web 7 after the electrodes have been so deposited are shown in FIGS. 2 and 3. It will be noted that in all cases the electrodes are narrower than and are centered within the Zones onto which they were applied, thus leaving perimeters on the Zones around the electrodes which will be used in the subsequent sealing step.

Sometime after the electrodes have been applied the continuous web 7 is cut so that the Zones Number 1, Number 2 and Number 3 are continuous strips which are structurally unconnected from each other. The continuous Zones Number 1, Number 2 and Number 3 are then collated so that at least one Zone Number 3 is between a Zone Number 1 and z Zone Number 2, so that the conductive plastics 50 in Zones Number 1 and Number 2 are facing the inside of the collation, and so that a deposit of positive electrode on one Zone is opposite a deposit of negative electrode on an adjacent Zone. A separator and electrolyte would be placed between each adjacent pair of electrodes in the collation and then the Zones would be sealed together around and between the electrode deposits.

Before the web is cut, however, it is desirable but not necessary to perform as many of the other required steps as is possible since, in general, subsequent collation and registration problems will be minimized if this is done. For this reason it is desirable to apply the separator, electrolyte, and sealing means onto the web before cutting the web. Consistent with this reasoning, a continuous strip of separator material 40 having patches of adhesive impregnated therein may be brought into contact with the web 7 after the electrodes 20 and 30 have been applied. An illustration of such a separator strip 40 is shown in FIG. 4. While it is possible to place the separator strip 40 shown in FIG. 4 over either the positive or negative electrodes, since it is only one Zone wide, it is possible and desirable to have a wider separator strip which is eight Zones wide with adhesive impregnations of sufficient size and number to produce eight of the strips shown in FIG. 4 after proper cutting; the eight Zone wide separator strip could be placed over the side of the web 7 on which the positive electrodes 20 are deposited, and the separator would subsequently be cut simultaneously with the cutting of the web into structurally unconnected Zones. Whether the separator is one or more Zones wide at the time they are placed in contact with the electrodes, the particular separator strip 40 shown in FIG. 4 has certain features which are advantageous in the collating and sealing steps shown in FIG. 5. The continuous strip separator material 40 has patches of electrically nonconductive adhesive 100 impregnated therein, with each patch being in the form of a closed loop inside of which is an area 42 of separator material which contains electrolyte. By impregnating the adhesive patches into the separator material first and then adding the electrolyte to the resultant enclosed areas 42, the electrolyte can be confined within those areas and prevented from migrating along the separator strip 40 while at the same time a better, more thorough adhesive impregnation can be obtained in the separator which results in a superior seal in the assembled battery. Such a concept is further described and claimed in application Ser. No. 99,983. As one alternative to the technique just described, adhesive patches could be impregnated into the continuous strip of separator material 40 after the electrolyte has been added to the separator. Another step which could be used instead of but which is preferably used in conjunction with the adhesive impregnations in the separator is to apply patches of adhesive 101 around the electrodes on Zones Number 1, Number 2 and Number 3 as shown in FIGS. 2, 3 and 5. By themselves these patches 101 would penetrate the separator strips and produce the desired seals when the collation of Zones and separator strips was pressed together; a sealing technique of this latter nature used in the production of single cell batteries is illustrated in U.S. Pat. No. 3,494,796. It is preferred, however, to use the patches 101 in combination with the adhesive patches in the separator strip; it has been found that this combination produces a better seal than the other alternatives discussed above which utilize a separator strip.

FIG. 3 also shows a series of dashes 180 being placed across the web between the electrodes. These dashes, which are purely optional, may serve as registration marks which facilitate the proper collation and registration after the web has been cut into structurally unconnected Zones. The registration marks 180 may be made by any method and from any material which is not incompatible with battery performance and which is compatible with the collation and registration devices used in the production machinery. Such registration marks should be applied to the web before the web is cut.

The collation of Zones Number 1, Number 2 and Number 3 and of the preferred separator strip after the web 7 has been cut to structurally disconnect the Zones is illustrated in FIG. 5. As shown in FIG. 5, the electrolyte impregnated areas 42 inside the patches of adhesive 100 in the separator strip 40 are positioned so that the impregnated areas are between and overlay a positive electrode on one Zone and a negative electrode on an adjacent Zone. The adhesive patches 100 register or mate with the corresponding adhesive patches 101 on the perimeters of the Zones surrounding the electrodes. After the desired number of Zones Number 3 and separator strips 40 have been collated between Zones Number 1 and Number 2 the sealing step is performed. Depending upon the particular sealant 100 which is used, the sealing may be achieved by the application of heat and/or pressure, although other satisfactory sealing techniques may also be used. The resultant multicell batteries may, if desired, be left structurally connected together after the sealing so as to form a chain of multicell batteries which are electrically connected in parallel. Alternatively the collated, sealed continuous strips may be cut so that the resultant multicell batteries are structurally and electrically disconnected from each other; such a discrete battery 5, illustrated in FIG. 6, may be obtained by cutting along the collated sealed continuous strips at the dashed, imaginary "cut" lines shown on the separator strip 40 in FIGS. 4 and 5 with an electrically nonconductive cutting instrument such as a saphire or ceramic knife, by laser beams, or by other suitable techniques. The cutting must be done in a manner so as to avoid producing undesired internal electrical paths within the battery, e.g., so as to prevent the electrically conductive plastic 50 from one Zone from coming into contact with the plastic 50 of another Zone. A portion of the assembled battery is shown in magnified cross-section in FIG. 7.

If desired the web 7 can be constructed so that the finished, assembled battery has one of its terminals wrapped around its edge which overlays the terminal on the opposite side. For some applications of the batteries it may be desirable to have both terminals on the same side of the battery. Many different modifications can be made in the web to achieve this same net result. One such modification is represented by dashed lines and the designation 70E which appear in FIGS. 1, 2, 3, 5, and 7. This optional extension 70E of the metal strip 70 projects beyond the edge of the plastic component of Zone Number 2, is wrapped around the edge of the collation and overlays the metal 60 of Zone Number 1. An electrical insulator must be interposed between the extension 70E and the composite Zone over which it is overlaid; while a nonconductive adhesive 100E of the same material as adhesive 100 is shown in the drawings for purposes of illustration, other nonconductive securing materials including a variety of hot melts used in the dry battery industry may be used to also secure the extension to the underneath Zone, and other nonsecuring nonconductors such as papers, felts, or films may be interposed between the extension and the Zone. An application claiming the resultant product having the "-wrapped around" terminal is being filed concurrently with this application. The particular construction shown in FIGS. 1, 2, 3, 5 and 7 utilizes the relatively good longitudinal conductivity of the metal as compared with the conductive plastic to minimize the power losses in conducting current around the edge of the battery. A battery with the "wrapped around" terminal adhered to the negative rather than the positive end of the battery can be obtained with the web 7 of FIGS. 1 and 2 (including metal extensions 70E) by transposing the positive and negative electrodes and therefore in effect transposing Zones Number 1 and Number 2 from the positions shown in FIGS. 1 and 2; such transposition results in the metallic strip of Zone Number 1 being wider than and extending beyond the edge of the plastic strip of Zone Number 1 and being adhered to the metal of Zone Number 2. Another modification of the web which results in the "wrapped around" electrode is the extension of the plastic-metal laminates at the edges of the web, rather than the extension of just the metal 70E as shown in FIGS. 1 and 2. Other modifications of the web which permit the construction of "wrapped around" terminals will be given below in the accounts of alternative web configurations or designs.

While the web 7 which is used with this invention must have at least one Zone Number 1, at least one Zone Number 2, and at least one Zone Number 3, there are numerous web configurations which meet these requirements and which can be used with this invention. FIGS. 8 through 14 illustrate a few of these many different web configurations.

FIG. 8 illustrates a web 7 which is symmetrical about its center line. On each side of the center line is one Zone Number 1, one Zone Number 2, and one Zone Number 3; each half of this web contains enough Zones to permit the construction of a two cell battery according to this invention. The web contains six Zones but only a single strip of electrically conductive plastic 50. As is true with the web shown in FIG. 1, the web of FIG. 8 has a metal strip 60 which is slit down the middle when the web is cut into unconnected Zones. The optional extensions 70E of metal strips 70 are also shown by dashed lines in FIG. 8.

The web 7 shown in FIG 9 differs from those shown in FIGS. 1 and 8 by having five Zones Number 3 on each side of the center line. Each half of this web contains enough Zones to permit the construction of a six cell battery according to this invention.

The web 7 shown in FIG. 10, which is likewise symmetrical about its center line, contains enough Zones to permit the construction of four four-cell batteries. An optional modification of the web 7, which could be made if a "wrapped around" terminal of metal-conductive plastic composite is desired in the finished batteries, is also illustrated. As part of this optional modification the plastic 50 and metal 60 could be extended at both edges of the web, as shown by dashed extensions 50E and 60E, respectively. An additional aspect of the modification is illustrated near the center of the web by the letter x, which represents the distance from the edge of the positive electrode 20 to the web centerline or the edge of Zone Number 1; this distance x could be increased to include a segment of plastic 50 metal 60 laminate equal in width to 50E and 60E.

FIG. 11 shows a symmetrical web 7 which contains enough Zones to permit the construction of two four-cell batteries. Note that the metal strips required by Zones Number 1 and Number 2 are undivided segments of a single wide metal strip, just as the plastic segments required by Zones Number 1, Number 2 and Number 3 are undivided segments of a single wide strip of electrically conductive plastic. A "wrapped around" terminal of metal-conductive plastic composite may be provided by increasing the distance x shown in FIG. 11 by an amount sufficient to permit the wrapping around of the composite.

Figure 12:
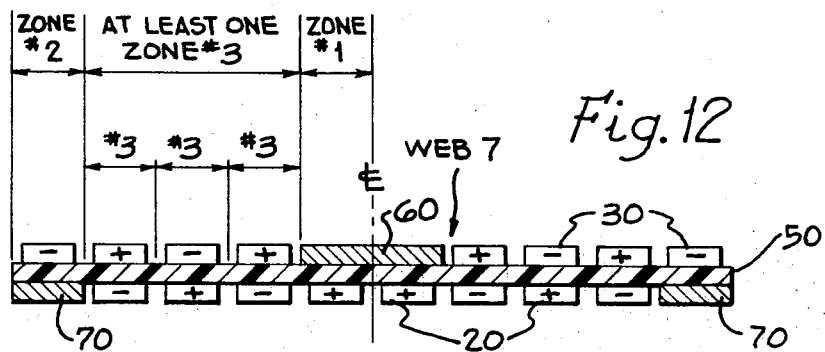

The web 7 shown in FIG. 12 differs from the one shown in FIGS. 2 and 3 to the extent that the positive electrodes 20 used in Zones Number 3 are not all on the same side of the web. With this web configuration, which is shown to illustrate the principle that electrodes of one polarity do not all have to be on the same side of the web, an inversion of at least one Zone Number 3 from each side of the centerline would be required during collation to get proper electrode polarity alignment.

A very simple configuration of the web 7 having the essential requirements is shown in FIG. 13. That web has one Zone Number 1, one Zone Number 2 and one Zone Number 3, is symmetrical about its centerline, and contains enough Zones to permit the construction of one two-cell battery. The web could, of course, be modified if desired to permit the resultant battery to have a "wrapped around" terminal of either metal or metal-conductive plastic composite.

Figure 14:
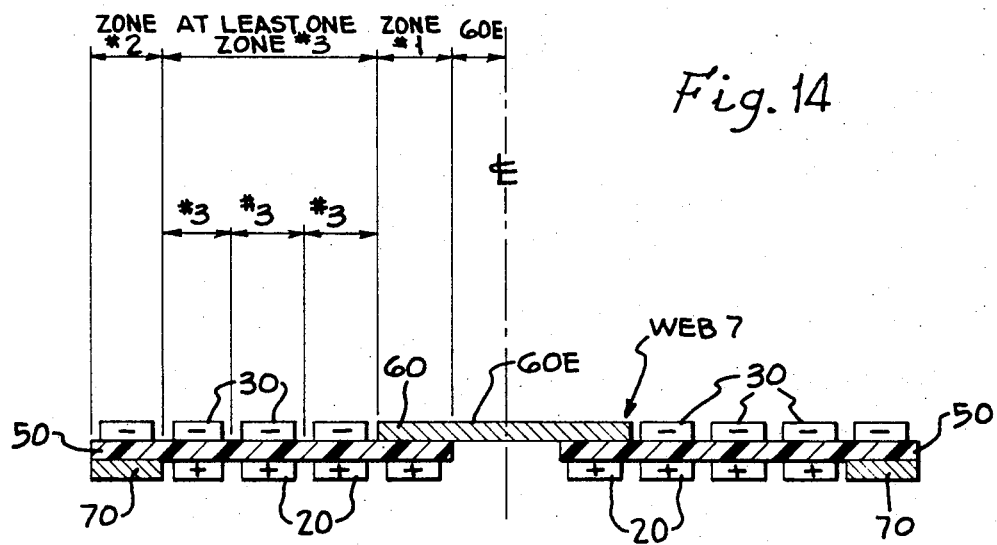

The web 7 shown in FIG. 14 is analagous to the web shown in FIGS. 2 and 3 (including the extensions 70E shown in those figures). FIG. 14 differs by placing the extensions 60E of the metal strips to be used for the "-wrapped around" terminals in the center of the web rather than at the edges. With the web shown in FIG. 14 both terminals would appear at the negative end of the assembled multicell battery, whereas with the web of FIGS. 2 and 3 both terminals appear at the positive end of the assembled battery (see FIGS. 5 and 7). Note that the web 7 of FIG. 14 includes two rather than one strip of electrically conductive plastic 50, with the plastic being discontinuous near the center of the web.

It was mentioned as a prelude to the description of the drawings that the thicknesses of the battery components shown in the drawings have been greatly exaggerated for purposes of clear illustration. This invention may be used and is particularly useful in the construction of very thin, flat, multicell batteries. The dimensions associated with the web, electrodes and separator illustrated in FIGS. 1 through 5, taken from an actual production line design, will serve to illustrate. Referring to FIGS. 1 through 3, the continuous strip of electrically conductive plastic 50 was a total of 27 ½ inches wide and 2 mils (thousandth of an inch) thick; of this total width, each of the two Zones Number 1 was 2 ¾ inches wide, each of the two Zones Number 2 was 2 ¾ inches wide, and each of the six Zones Number 3 was 2 ¾ inches wide. The metal strip 60 shown in the center of the web was steel and was 5 ⅜ inches wide. The metal strips 70 at the two outer edges of the web were also steel and were each 3 ¾ inches wide, of which 2 11/16 inches width was joined to the conductive plastic of Zones Number 2 while the remaining 1 1/16 inches of metal extended outward as extension 70E to provide for a "wrapped around" terminal. Each of the metal strips 60 and 70 was 1 ½ mils thick. The electrode deposits 20 and 30, which were centered in each of the Zones, were approximately 2 1/16 inches wide. The electrode deposits, which might be as much as 20 to 25 mils or more but would typically be 10 mils or less in thickness, were approximately 2 15/16 inches long (along the length of the Zone) and a space of about 5/8 inches clear space was provided between the nearest edges of consecutive electrodes. After the electrodes were applied to the web the web was cut by steel slitting wheels to disconnect the Zones from one another. The separator strips 40, which were made from nonwoven polyester fabric, were 3 ½ mils thick and had areas 42 which were centered about and approximately the same horizontal dimensions as the electrodes.

It will be evident that difficulties may be encountered in processing a continuous strip web of such extreme thinness through high speed machinery. Such machinery may, for example, move the web at rates of 75 linear feet per minute or more. In order to achieve these production speeds, or even to process the plastic strip at any speed, it is necessary for the machinery to impart tension to the web. Although it is not necessary it may be desirable to have the web be symmetrical in order to facilitate handling of the web under tension.

Several other aspects of the web may be mentioned briefly. The continuous nature of the plastic and metal components of the web can be attained by appropriate splicing machines which splice the end of one roll of material to the end of another.

As is shown in FIGS. 5 and 7, each plastic, metal, and separator member of the assembled battery must be slightly longer than the other plastic, metal, and separator members beneath it. This slight increase in length of the separators 40 and the plastic members 50 of Zones Number 3 will occur simultaneously with and as a result of the sealing step, that step providing enough tension in those members to stretch them by the required amounts. The plastic-metal laminate of Zone Number 1, which must be increased in length the greatest amount as shown in FIG. 7, may be indented or pocketed into the desired shape prior to the application of the positive electrode 20 to that Zone if desired; such an indention will facilitate the sealing.

Section 2: Two or More Continuous Strips

This section will describe embodiments of the invention which have in common the characteristics that Zones Number 1, Number 2 and Number 3 are not all structurally connected together during electrode application.

Figure 15:
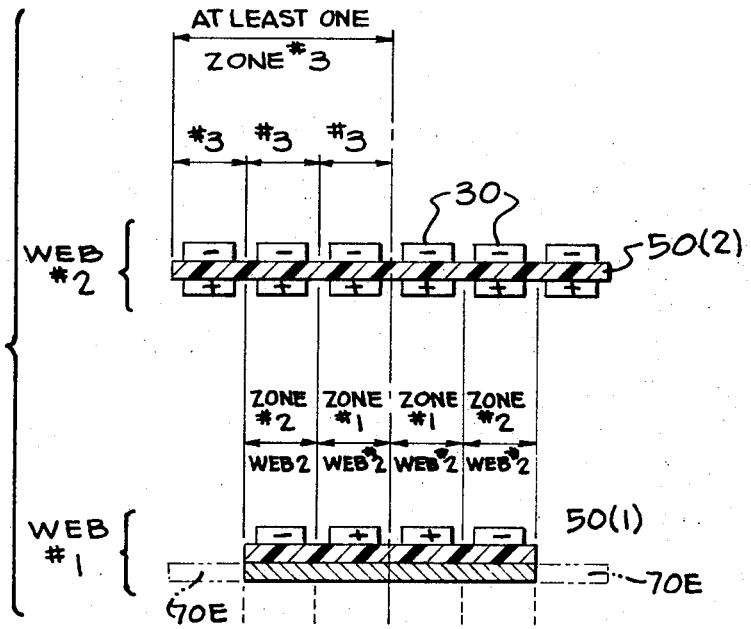
FIG. 15 shows an embodiment using two webs to achieve production equivalent to that obtained with the single wide web of FIG. 1.

FIG. 15 illustrates an embodiment which is alternative to and which offers similar production capabilities as the web appearing in FIGS. 1–3. FIG. 15 shows two webs, the first of which is a composite of metal 60 and 70 and electrically conductive plastic 50(1) which is wide enough to provide two Zones Number 1 and two Zones Number 2, with the extensions of metal 70E to provide wrapped around terminals being shown as optional features. The second web consists of electrically conductive plastic 50(2) which is wide enough to provide six Zones Number 3. Collectively the two webs provide enough Zones to permit construction of two four-cell batteries. Appropriate inversions of some of the Zones after cutting of the web would be required to obtain proper electrode orientation. It will be noted that each web is symmetrical about its center line and that each has a uniform cross-section across its full width; these features facilitate processing. The composite web Number 1 of FIG. 1 is relatively easy to produce due to its uniform cross-section. The use of two webs permits a different amount of tension to be applied to the composite Zones than is applied to Zones Number 3, which also offers certain processing advantages.

Figure 16:
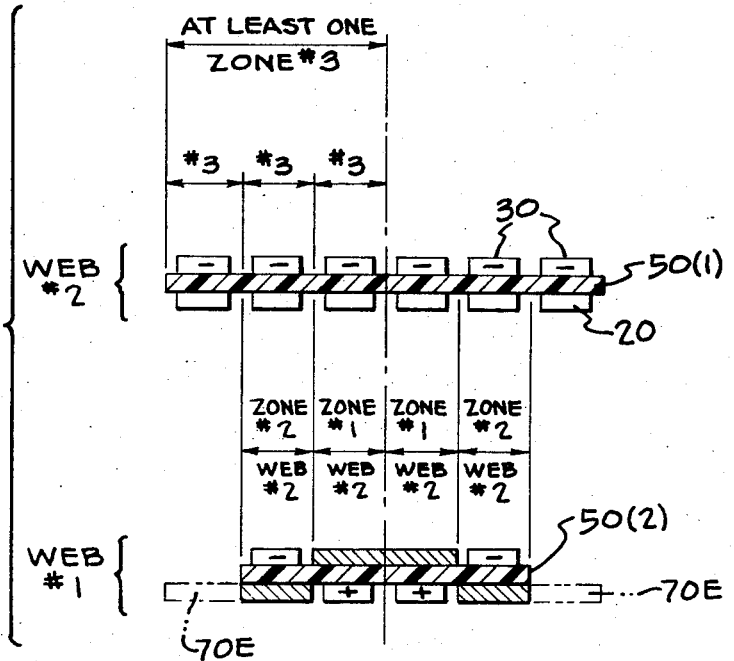
FIG. 16 is an alternative to FIG. 15.

FIG. 16 illustrates still another embodiment which is alternative to and which offers the same production rates as the web appearing in FIGS. 1–3. FIG. 16 to similar to FIG. 15, differing in the construction of web Number 1. Web Number 1 of FIG. 16 shows how the web 7 of FIGS. 1–3 would look if that web 7 contained no Zones Number 3. Both webs of FIG. 16 are symmetrical about their center lines. It will be noted that no inversions of any of the Zones shown in FIG. 16 would be necessary to obtain proper electrode orientation.

It will be apparent that while each of the Zones shown in FIGS. 15 and 16 could have been structurally unconnected to any other Zone at the time the electrodes were being applied, certain processing advantages can be achieved by reducing the number of webs to two. It will also be apparent that just as FIGS. 15 and 16 show alternatives to the single wide web 7 shown in FIGS. 1–3, so are there alternatives involving two or more continuous strips of Zones which could be substituted for the single wide web 7 of FIGS. 8–14.

Section 3: Production of Composite Zones Number 1 and Number 2 After Electrode Application FIGS. 1–16 and Sections 1 and 2 above describe embodiments in which the composites of Zones Number 1 and Number 2 have been produced before the electrodes were applied to the conductive plastic. The purpose of this Section and of FIG. 17 is to illustrate that the production of the composites in Zones Number 1 and Number 2 may occur after the electrodes have been applied to the conductive plastic 50 which is a component of those Zones.

FIG. 17 shows a continuous strip of electrically conductive plastic 50 coming from a roll or other source of supply. As the strip of conductive plastic 50 travels along an electrode applicator applies intermittent deposits of electrodes of desired polarity onto one side of the strip (positive electrodes 20 or negative electrodes 30). Afterward a continuous strip of electrically conductive material analagous to the strips 60 and 70 shown in FIGS. 1-14 is joined to the side of the conductive plastic opposite the electrodes by appropriate means so that the necessary composites for Zones Number 1 and Number 2 are obtained. It should be pointed out that the production method illustrated schematically by FIG. 17 can be used with strips of conductive plastic which are more than one Zone in width and that the production method can also be used with both the single wide web method shown in FIGS. 1-14 or with the multiple web approach illustrated in FIGS. 15 and 16.

Certain methods of joining the strips of electrically conductive material 60 or 70 with the strips of conductive plastic 50 may require the application of heat to one or both strips, e.g., certain heat lamination techniques. Certain electrode formulations may require that the electrodes be heated and dried after being applied onto the strip of conductive plastic. Where the particular production system employed requires both of these steps, it may be desirable to use the production method illustrated by FIG. 17 and to perform both steps in a common oven or heating chamber.

Section 4: The Materials

The process of this invention may utilize a wide variety of materials.

The electrically conductive plastic used in the continuous carrier strip 50 may be produced by casting, extrusion, calendaring, or other suitable techniques. The conductive plastics may be made, for example, from materials such as polymers loaded with electrically conductive particles and containing various stabilizers and/or plasticizers. The conductive particles may be carbonaceous materials such as graphite or acetylene black, or metallic particles may also be used. Polymers which by themselves are sufficiently conductive may also be used. The conductive plastic, whether loaded or unloaded, must be made from a composition which is compatible with other components of the battery. For batteries using LeClanche and moderately concentrated alkaline electrolytes, the conductive plastic may be made for example, from materials such as polyacrylates, polyvinyl halides, polyvinylidene halides, polyacrylonitriles, copolymers of vinyl chloride and vinylidene chloride, polychloroprene, and butadiene-styrene or butadiene-acrylonitrile resins. For batteries using strongly alkaline electrolytes, polyvinylchloride and polyolefins such as polyethylene and polyisobutylene may be used in the preparation of the conductive plastic. For batteries using acid electrolytes such as sulfuric acid polyvinyl halides, copolymers of vinyl chloride, and vinylidene chloride may be used.

The electrically conductive materials 60 and 70 used in the production of Zones Number 1 and Number 2 may be varied in both materials and the form or structure of the materials. With one preferred embodiment these conductive materials are metallic strips made from such metals as steel, aluminum, lead or zinc. These metals are relatively inexpensive, they are good electrical conductors, and they can be obtained in foils of extreme thinness which are substantially free of pinholes. The foils of these metals can be purchased in rolls of great length and thus are well suited for use in high speed, continuously operating laminating machinery. These metals may also be laminated to some conductive plastics by the application of heat and pressure without requiring any intermediary adhesives between the layers, or they can be laminated using intermediate adhesives. The conductive materials 60 and 70 may also consist of metalized deposits such as flame sprays, vapor deposits, sputtering and others or of films impregnated with metallic or other conductive particles and applied by casting, doctor blading, or other techniques. It will be apparent that the particular means and method used to join the conductive plastic 50 and the conductive material 60 and 70 together will be dependent upon both the material and the form or structure of the material being used as component 60 or 70. For this reason FIG. 17 refers simply to appropriate means for joining the two strips together to produce composite Zones Number 1 and Number 2.

The positive electrodes 20 may each comprise particles of electrochemically positive active material contained in and dispersed throughout a binder matrix. The positive active material conventionally is divided into tiny particles so as to increase the rate at which the electrochemical reactions can occur by increasing the surface area where they occur. The binder increases the electronic conductivity of the electrode, increases the structural integrity within the positive electrode, and adheres the positive electrode to the carrier strip. Since electrolyte must have access to the surface of the active material particles, the electrode must be made sufficiently porous so that the electrolyte may diffuse throughout the electrode rapidly and thoroughly. Preferably the pores in the electrode are produced by the evaporation of liquid during the construction of the electrode; the evaporating liquid may be part of a dispersion binder system in which the solid binder contained in the finally constructed electrode comprises tiny particles of binder material dispersed throughout and not dissolved in the liquid while the electrode is being constructed, or the evaporating liquid may be part of a solution binder system in which the solid binder contained in the finally constructed electrode is dissolved in the liquid which is later evaporated. The porosity of the positive electrodes may be increased as the discharge rate desired in the battery is increased. Electrodes may also be constructed using various combinations of the dispersion and solution systems. Alternatively, the pores might be produced by the dissolving of a solid which was present during construction of the electrode or by passing gases through or generating gases within the electrodes at controlled rates during electrode construction. The positive electrodes 20 may, and preferably will, also contain amounts of a good electrical conductor such as carbon or graphite to improve the electrical conductivity between the active material particles themselves generally being relatively poor conductors of electricity. The conductivity of the active material particles together with the conductivity of the binder itself will influence the amounts of conductors added to the electrode. The electrodes 20 may also contain if desired small amounts of additional ingredients used for such purposes as maintaining uniform dispersion of active material particles during electrode construction, aiding the diffusion of electrolyte through the pores of the finally constructed electrodes, controlling viscosity during processing, controlling surface tension, controlling pot life, or for other reasons.

The negative electrodes 30 may comprise spray or vapor deposits of metals or may comprise tiny particles of metal contained in and dispersed throughout a binder matrix. If the negative electrodes utilize a binder matrix, in general the same considerations regarding that matrix apply to the negative electrodes as do for the positive electrodes except tat no electrical conductor may be needed to achieve desired electrical conductivity between the active material particles since the negative active materials are generally better conductors than are the positive materials. When the negative electrodes utilize a binder matrix, the binder system need not be the same as the one used in the positive electrodes, and even if it is the proportions of binder, active material particles, and other ingredients in the negative electrodes may have a different optimum than the proportions of analagous ingredients in the positive electrode. When the negative electrodes 20 are deposited onto the web in the form of liquid dispersions of active materials and binder, the electrodes should be dried before being further processed. The initial porosity of the negative electrodes may sometimes be less than that of the positive electrodes, since the negative electrode discharge reaction products are sometimes dissolved in the battery electrolyte. The porosity of the negative electrodes may be increased as the discharge rate desired in the battery is increased. The negative electrodes 30 may also comprise thin sheets or foils of electrochemically negative material.

If the positive and negative electrodes 20 and 30 respectively have the active material particles dispersed in a binder matrix as mentioned above, they may be applied onto the continuous strips by such techniques as the rotogravure or reverse roll coating methods used in the printing arts. Such methods are suitable for applying liquids of varying viscosities onto carriers and may be used with modern, high speed rotary production machinery. Where the electrodes are deposited in the form of such liquids, the electrodes should be dried before being further processed; the drying can be achieved by passing the web through appropriate ovens or drying chambers. Other methods of applying the positive electrodes onto the web include silk screening stenciling, and flexographic printing techniques; the particular application technique selected will depend not only upon the composition of the electrodes as they are deposited but on such additional factors as the desired thickness of the electrodes, the speed at which the continuous Zones move with respect to the applicators, and others. For these reasons the electrode applicator shown in FIG. 17 is illustrated in general terms only. It is preferred to use this invention with positive and negative electrode compositions which, when placed onto the conductive plastic of Zones Number 1, Number 2, and Number 3 comprise active material particles dispersed in a binder matrix.

It is necessary to place a separator and electrolyte between each adjacent pair of electrodes in the collation. This requirement may be met in different ways with different materials. One approach is with the use of a continuous strip of separator material 40 such as that illustrated in FIGS. 4 and 5. Such separators may be made from a wide variety of materials including the synthetic fibers, microporous polymer sheets, and cellulosic materials which are conventional in battery construction as well as from woven or non-woven fibrous materials such as polyester, nylon, polypropylene, polyethylene, and glass. Liquid electrolyte solutions could be impregnated into these separator strips or patches of viscous, gelled electrolyte could be applied onto one or both sides of the separator strip. The viscous, gelled electrolytes, which can be made including a wide variety of gelling agents, would contain the needed electrolyte and also adhere or bond to the adjacent electrodes to produce good conductivity. As another alternative, deposits of viscous, gelled electrolytes could by themselves serve as both separators and as electrolyte if of proper thickness and/or consistency, making a distinct separator such as the member 40 shown in FIGS. 4 and 5 unnecessary. All such alternatives are included within this invention as ways of placing a separator and electrolyte between each adjacent pair of electrodes in the collation.

Several observations should be made in regard to the role of the adhesive patches which provide the seals around the electrodes. As mentioned earlier, preferably these patches may be impregnated into the separator strip before the electrolyte is added to that strip. The adhesive should be applied in liberal quantity so that all of the pores in the separator are completely filled in the area to which the adhesive is applied and so that there is sufficient excessive adhesive to coat and adhere to the other members being sealed by the patches. The adhesives should be electrically nonconductive. The adhesives themselves may be selected from a wide variety of materials including such adhesive cements as catalyzed uncured epoxy resins, phenolic resin solutions, ethylene copolymer hot melts, pressure sensitive elastomer mixtures, thermoplastic resin solutions, and natural gums and resins and their solutions. Faster and more thorough and complete impregnation of the adhesive into the separator may be achieved with many hot melt cements by making the impregnations with heated adhesives. The adhesives which may be used may be ones which attain their adhesive quality for the first time during assembly of the battery as a result of the application of pressure, heat, ultrasonics, or other forms of energy. Where gelled electrolytes are used as the only separators between adjacent electrodes, sealant deposits 101 of the type shown in FIGS. 2 and 3 may be used to achieve the sealing.

While it is preferred to employ the LeClanche electrochemical system (comprising manganese dioxide positive active material, zinc negative active material, and an electrolyte comprising ammonium chloride and/or zinc chloride), the multicell battery 5 of this invention may employ a wide variety of electrochemical system including both primary and secondary systems. Among the positive electrode materials are such commonly used inorganic metal oxides as manganese dioxide, lead dioxide, nickel oxyhydroxide, mercuric oxide and silver oxide, inorganic metal halides such as silver chloride and lead chloride and organic materials capable of being reduced such as dinitrobenzene and azodicarbonamide compounds. Among the negative electrode materials are such commonly used metals as zinc, aluminum, magnesium, lead, cadmium, and iron. This invention may employ the electrolytes commonly used in the LeClanche system (ammonium chloride and/or zinc chloride), various alkaline electrolytes such as the hydroxides of potassium, sodium and/or lithium, acidic electrolytes such as sulfuric or phosphoric acid, and nonaqueous electrolytes, the electrolytes of course being chosen to be compatible with the positive and negative electrodes.

Among the wide variety of electrochemical systems which may be used in the multicell battery 5 are those in which the positive electrodes comprise manganese dioxide, the negative electrodes comprise metals such as zinc, aluminum, or magnesium, and the electrolyte substantially comprises an acidic solution of inorganic salts. Another commonly known system useful in the battery 5 is the alkaline manganese system in which the positive electrodes comprise manganese dioxide, the negative electrodes comprise zinc, and the electrolyte substantially comprises a solution of potassium hydroxide. Other aqueous electrolyte systems including those of nickel-zinc, silver-zinc, mercury-zinc, mercury-cadmium, and nickel-cadmuim may also be used.

Systems employing organic positive electrodes and acidic electrolytes may also be used, including rechargeable systems using azodicarbonamide compound electrodes and LeClanche electrolyte.

We claim:

1. A method of constructing multicell batteries comprising the steps of:

a. placing intermittent deposits of electrodes along at least one Zone Number 1, along at least one Zone Number 2, and along at least one Zone Number 3, Zone Number 1 being defined as a composite of a first continuous strip of electrically conductive plastic and a second continuous strip of electrically conductive material, zone Number 2 being defined as a composite of a first continuous strip of electrically conductive plastic and a second continuous strip of electrically conductive material, and Zone Number 3 being defined as a continuous strip of electrically conductive plastic, the placing of intermittent deposits of electrodes along the continuous web being more particularly described as i. placing intermittent deposits of positive electrodes along the electrically conductive plastic side of each Zone Number 1, ii. placing intermittent deposits of negative electrodes along the electrically conductive plastic side of each Zone Number 2, and iii. placing intermittent deposits of positive and negative electrodes along each Zone Number 3, each deposit of positive electrode being on the other side of a Zone Number 3 from and substantially opposite a deposit of negative electrode;

b. collating the continuous Zones Number 1, Number 2 and Number 3 so that at least one Zone Number 3 is between a Zone Number 1 and a Zone Number 2, so that the electrically conductive plastics in Zones Number 1 and Number 2 are facing the inside of the collation, and so that a deposit of positive electrode on one Zone is opposite a deposit of negative electrode on an adjacent Zone;

c. placing a separator and electrolyte between each adjacent pair of electrodes in the collation; and, d. sealing the Zones together around and between the electrode deposits.

2. The method of claim 1 in which the second electrically conductive material contained in one of the composite Zones is wider than and extends beyond the edge of the strip of electrically conductive plastic to which it is joined and in which the extension of that second electrically conductive material is wrapped around the edge of the collation and overlaid above the other composite Zone on the opposite side of the collation, an electrical insulator being interposed between the extension and the composite Zone over which it is overlaid.

3. The method of claim 1 in which the electrically conductive material contained in the composites of Zones Number 1 and Number 2 are foils of metal selected from the group consisting of steel, aluminum, lead and zinc.

4. The method of claim 2 in which the electrically conductive material contained in the composites of Zones Number 1 and Number 2 are foils of metal selected from the group consisting of steel, aluminum, lead and zinc.

5. The method of claim 1 in which the positive and negative electrodes, when placed onto the conductive plastic of Zones Number 1, Number 2 and Number 3, comprise active material particles dispersed in a binder matrix.

6. The method of claim 5 in which the positive electrode active material particles are manganese dioxide, the negative electrode active material particles are zinc, and the electrolyte comprises a chloride solution made from chloride salts selected from the group consisting of ammonium chloride and zinc chloride.

7. The method of claim 4 in which the positive and negative electrodes, when placed onto the conductive plastic of Zones Number 1, Number 2 and Number 3, comprise active material particles dispersed in a binder matrix.

8. The method of claim 7 in which the positive electrode active material particles are manganese dioxide, the negative electrode active material particles are zinc, and the electrolyte comprises a chloride solution made from chloride salts selected from the group consisting of ammonium chloride and zinc chloride.

9. A method of constructing multicell batteries comprising the steps of:

a. placing intermittent deposits of electrodes along a continuous web, the web comprising at least one Zone Number 1, at least one Zone Number 2, and at least one Zone Number 3, Zone Number 1 being defined as a composite of a first continuous strip of electrically conductive plastic and a second continuous strip of electrically conductive material, Zone Number 2 being defined as a composite of a first continuous strip of electrically conductive plastic and a second continuous strip of electrically conductive material, and Zone Number 3 being defined as a continuous strip of electrically conductive plastic, the placing of intermittent deposits of electrodes along the continuous web being more particularly described as i. placing intermittent deposits of positive electrodes along the electrically conductive plastic side of each Zone Number 1,
  ii. placing intermittent deposits of negative electrodes along the electrically conductive plastic side of each Zone Number 2, and
  iii. placing intermittent deposits of positive and negative electrodes along each Zone Number 3, each deposit of positive electrode being on the other side of a Zone Number 3 from and substantially opposite a deposit of negative electrode;

b. cutting the continuous web having the electrode deposits thereon so that the Zones Number 1, Number 2 and Number 3 are continuous strips which are structurally unconnected from each other;

c. collating the continuous Zones Number 1, Number 2 and Number 3 so that at least one Zone Number 3 is between a Zone Number 1 and a Zone Number 2, so that the electrically conductive plastics in Zones Number 1 and Number 2 are facing the inside of the collation, and so that a deposit of positive electrode on one Zone is opposite a deposit of negative electrode on an adjacent Zone;

d. placing a separator and electrolyte between each adjacent pair of electrodes in the collation; and, e. sealing the Zones together around and between the electrode deposits.

10. The method of claim 9 in which the second electrically conductive material contained in one of the composite Zones is wider than and extends beyond the edge of the strip of electrically conductive plastic to which it is joined and in which the extensions of that second electrically conductive material is wrapped around the edge of the collation and overlaid above the other composite Zone on the opposite side of the collation, an electrical insulator being interposed between the extension and the composite Zone over which it is overlaid.

11. The method of claim 9 in which the electrically conductive material contained in the composites of Zones Number 1 and Number 2 are foils of metal selected from the group consisting of steel, aluminum, lead and zinc.

12. The method of claim 10 in which the electrically conductive material contained in the composites of Zones Number 1 and Number 2 are foils of metal selected from the group consisting of steel, aluminum, lead and zinc.

13. The method of claim 9 in which the positive and negative electrodes, when placed onto the conductive plastic of Zones Number 1, Number 2 and Number 3, comprise active material particles dispersed in a binder matrix.

14. The method fo claim 13 in which the positive electrode active material particles are manganese dioxide, the negative electrode active material particles are zinc, and the electrolyte comprises a chloride solution made from chloride salts selected from the group consisting of ammonium chloride and zinc chloride.

15. The method of claim 12 in which the positive and negative electrodes, when placed onto the conductive plastic of Zones Number 1, Number 2 and Number 3, comprise active material particles dispersed in a binder matrix.

16. The method of claim 15 in which the positive electrode active material particles are manganese dioxide, the negative electrode active material particles are zinc, and the electrolyte comprises a chloride solution made from chloride salts selected from the group consisting of ammonium chloride and zinc chloride.

17. The method of claim 9 in which the continuous web comprises at least two Zones Number 1, at least two Zones Number 2, and at least two Zones Number 3, the continuous web being symmetrical about its center line.

18. A method of constructing multicell batteries comprising the steps of:

a. producing a Zone Number 1 with intermittent deposits of positive electrode applied on one side thereof by
  i. placing intermittent deposits of positive electrode along one side of a continuous strip of electrically conductive plastic, and
  ii. joining a second continuous strip of electrically conductive material to the strip of electrically conductive plastic on the side of the plastic opposite the electrodes, the resultant composite of continuous strips being defined as Zone Number 1;

b. producing a Zone Number 2 with intermittent deposits of negative electrode applied on one side thereof by
  i. placing intermittent deposits of negative electrode along one side of a continuous strip of electrically conductive plastic, and
  ii. joining a second continuous strip of electrically conductive material to the strip of electrically conductive plastic on the side of the plastic opposite the electrodes, the resultant composite of continuous strips being defined as Zone Number 2;

c. producing a Zone Number 3 with intermittent deposits of positive and negative electrodes thereon, the Zone Number 3 being defined as a continuous strip of electrically conductive plastic, the intermittent deposits of electrodes being placed along Zone Number 3 so that each deposit of positive electrode is on the other side of Zone Number 3 from and substantially opposite a deposit of negative electrode;

d. collating the continuous Zones Number 1, Number 2 and Number 3 with the electrodes deposited thereon so that at least one Zone Number 3 is between a Zone Number 1 and a Zone Number 2, so that the electrically conductive plastics in Zones Number 1 and Number 2 are facing the inside of the collation, and so that a deposit of positive electrode on one Zone is opposite a deposit of negative electrode on an adjacent Zone;

e. placing a separator and electrolyte between each adjacent pair of electrodes in the collation; and, f. sealing the Zones together around and between the electrode deposits.

19. The method of claim 18 in which the second electrically conductive material contained in one of the composite Zones is wider than and extends beyond the edge of the strip of electrically conductive plastic to which it is joined and in which the extension of that second electrically conductive material is wrapped around the edge of the collation and overlaid above the other composite Zone on the opposite side of the collation, an electrical insulator being interposed between the extension and the composite Zone over which it is overlaid.

20. The method of claim 18 in which the electrically conductive material contained in the composites of Zones Number 1 and Number 2 are foils of metal selected from the group consisting of steel, aluminum, lead and zinc.

21. The method of claim 19 in which the electrically conductive material contained in the composites of Zones Number 1 and Number 2 are foils of metal selected from the group consisting of steel, aluminum, lead and zinc.

22. The method of claim 18 in which the positive and negative electrodes, when placed onto the conductive plastic of Zones Number 1, Number 2 and Number 3, comprise active material particles dispersed in a binder matrix.

23. The method of claim 22 in which the positive electrode active material particles are manganese dioxide, the negative electrode active material particles are zinc, and the electrolyte comprises a chloride solution made from chloride salts selected from the group consisting of ammonium chloride and zinc chloride.

24. The method of claim 21 in which the positive and negative electrodes, when placed onto the conductive plastic of Zones Number 1, Number 2 and Number 3, comprise active material particles dispersed in a binder matrix.

25. The method of claim 24 in which the positive electrode active material particles are manganese dioxide, the negative electrode active material particles are zinc, and the electrolyte comprises a chloride solution made from chloride salts selected from the group consisting of ammonium chloride and zinc chloride.

* * * * *